United States Patent [19]

Charlton

[11] 4,324,315
[45] Apr. 13, 1982

[54] APPARATUS FOR LUBRICATING ELECTRICAL CABLE

[75] Inventor: Webster T. Charlton, Lowell, Mass.

[73] Assignee: Stone and Webster Eng. Cor., Boston, Mass.

[21] Appl. No.: 235,789

[22] Filed: Feb. 19, 1981

Related U.S. Application Data

[62] Division of Ser. No. 39,484, May 15, 1979, Pat. No. 4,296,837.

[51] Int. Cl.³ ............................................... F16N 7/00
[52] U.S. Cl. ................................... 184/15 R; 118/307; 134/199
[58] Field of Search ................. 184/15 R, 15 A, 6.26; 118/306, DIG. 10, 307, 317, DIG. 18, DIG. 22; 134/199, 64 R, 122 R

[56] References Cited

U.S. PATENT DOCUMENTS

| 3,362,109 | 1/1968 | Wallace | 118/307 X |
| 3,736,618 | 6/1973 | Ramsey | 134/64 R X |
| 3,800,435 | 4/1974 | Woellner | 134/122 R X |
| 3,916,925 | 11/1975 | Crump | 118/307 X |
| 3,918,467 | 11/1975 | Alberny et al. | 134/64 R X |
| 4,046,225 | 9/1977 | Shenk | 184/15 R |
| 4,169,427 | 10/1979 | Crump et al. | 184/15 R X |

Primary Examiner—David H. Brown
Attorney, Agent, or Firm—Morgan, Finnegan, Pine & Lee

[57] ABSTRACT

An apparatus and method for lubricating cable. A split ring carrying a plurality of nozzles which ring is adapted for releasable attachment to the entry end of an electric conduit and a centrally disposed lubricating device which travels with the leading end of a cable bundle are combined or used separately to lubricate cable being pulled through conduit.

5 Claims, 6 Drawing Figures

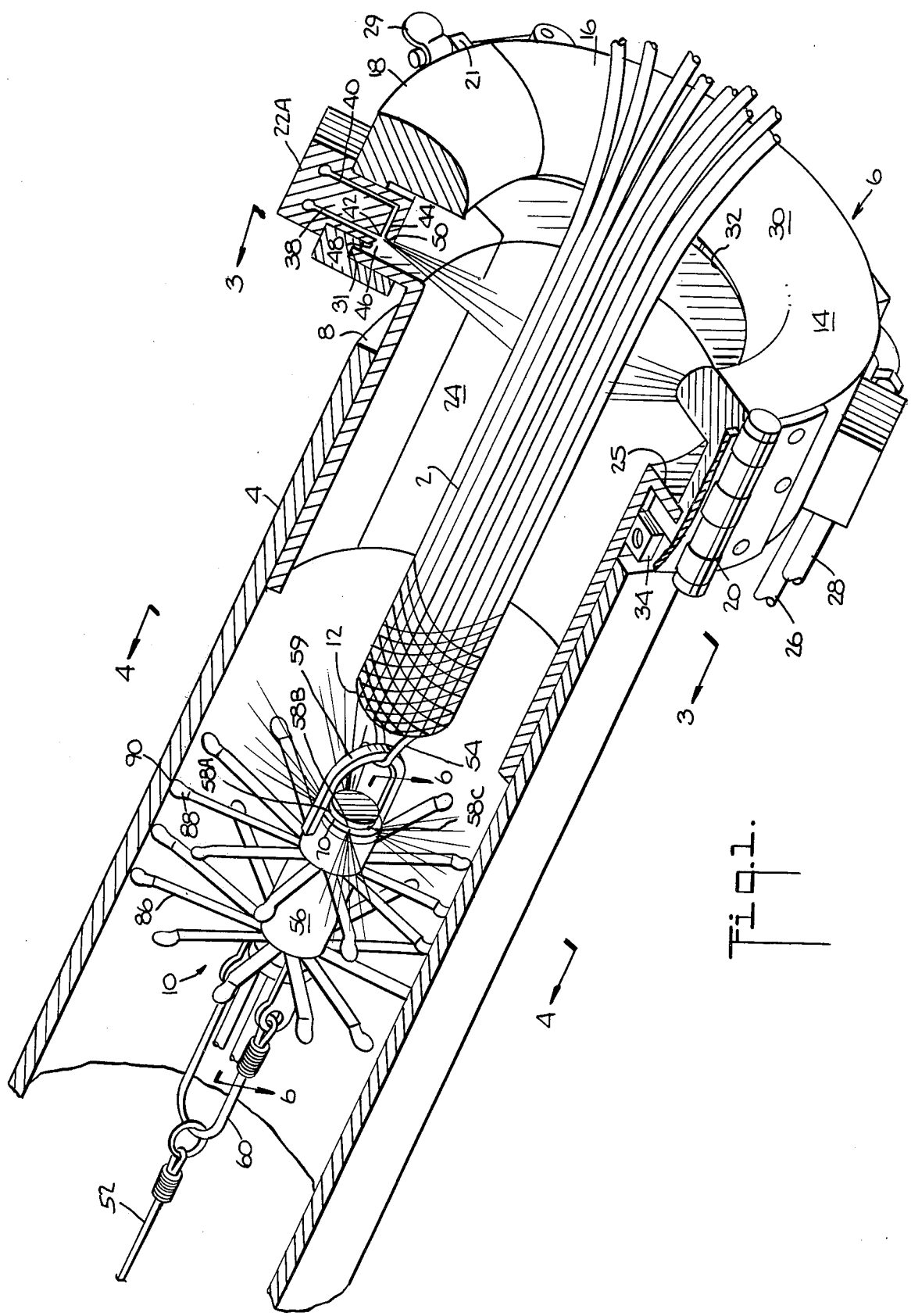

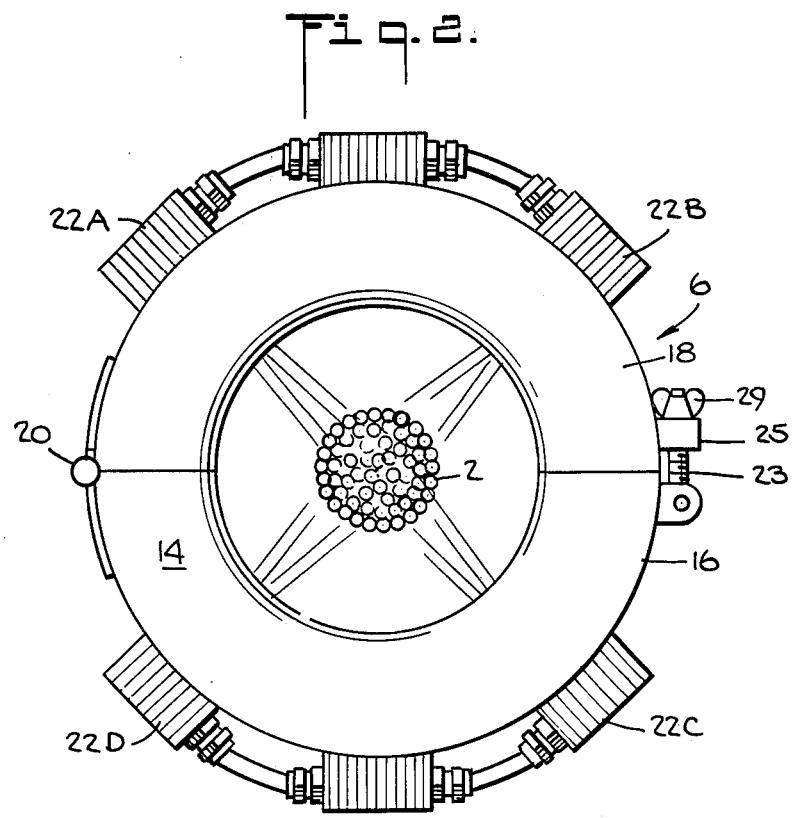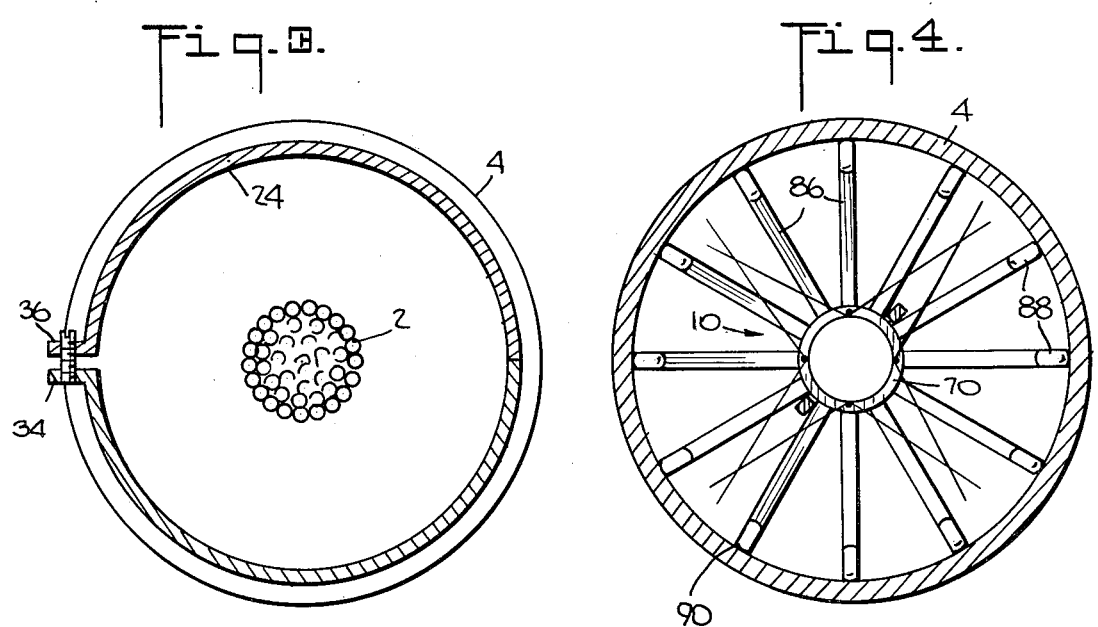

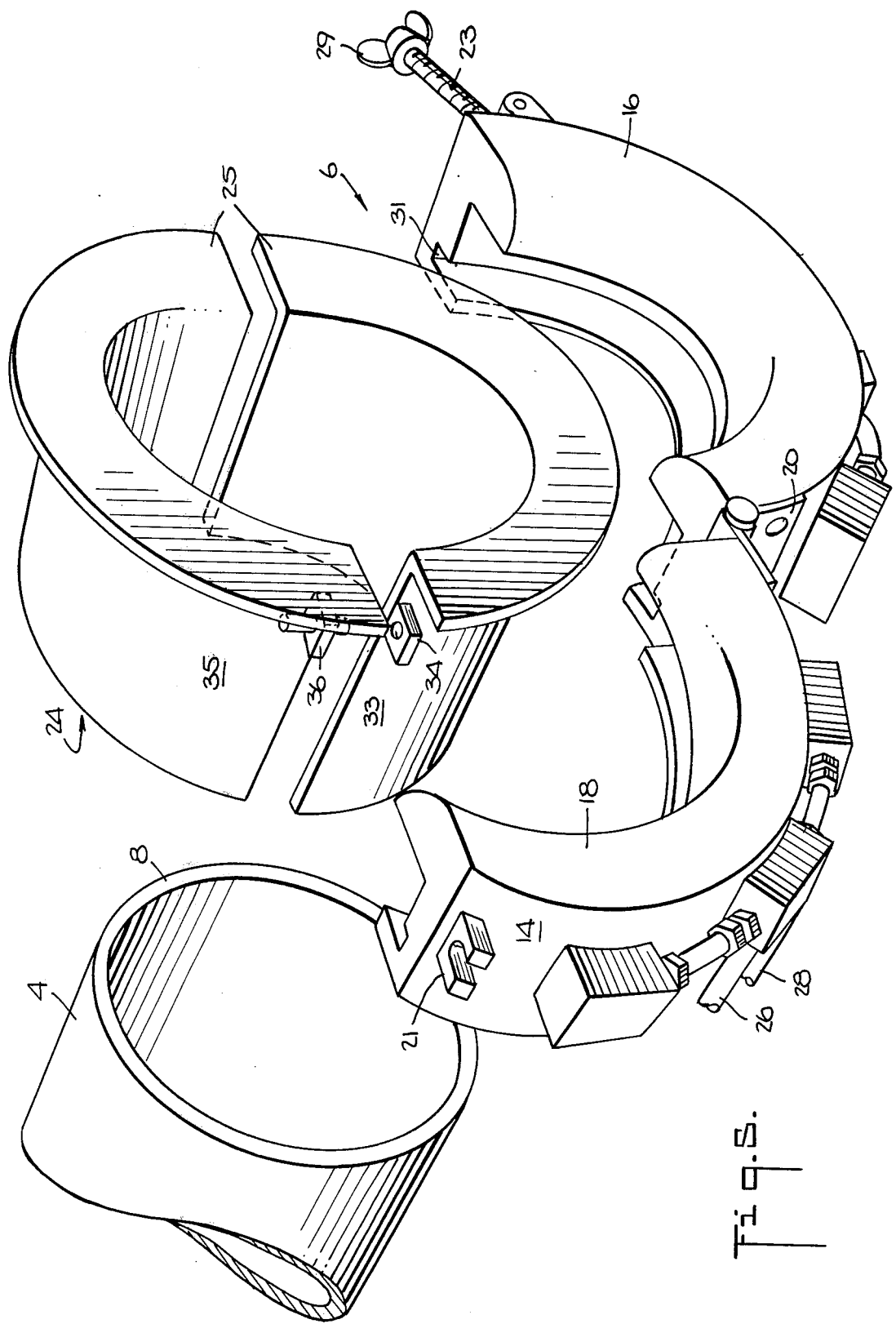

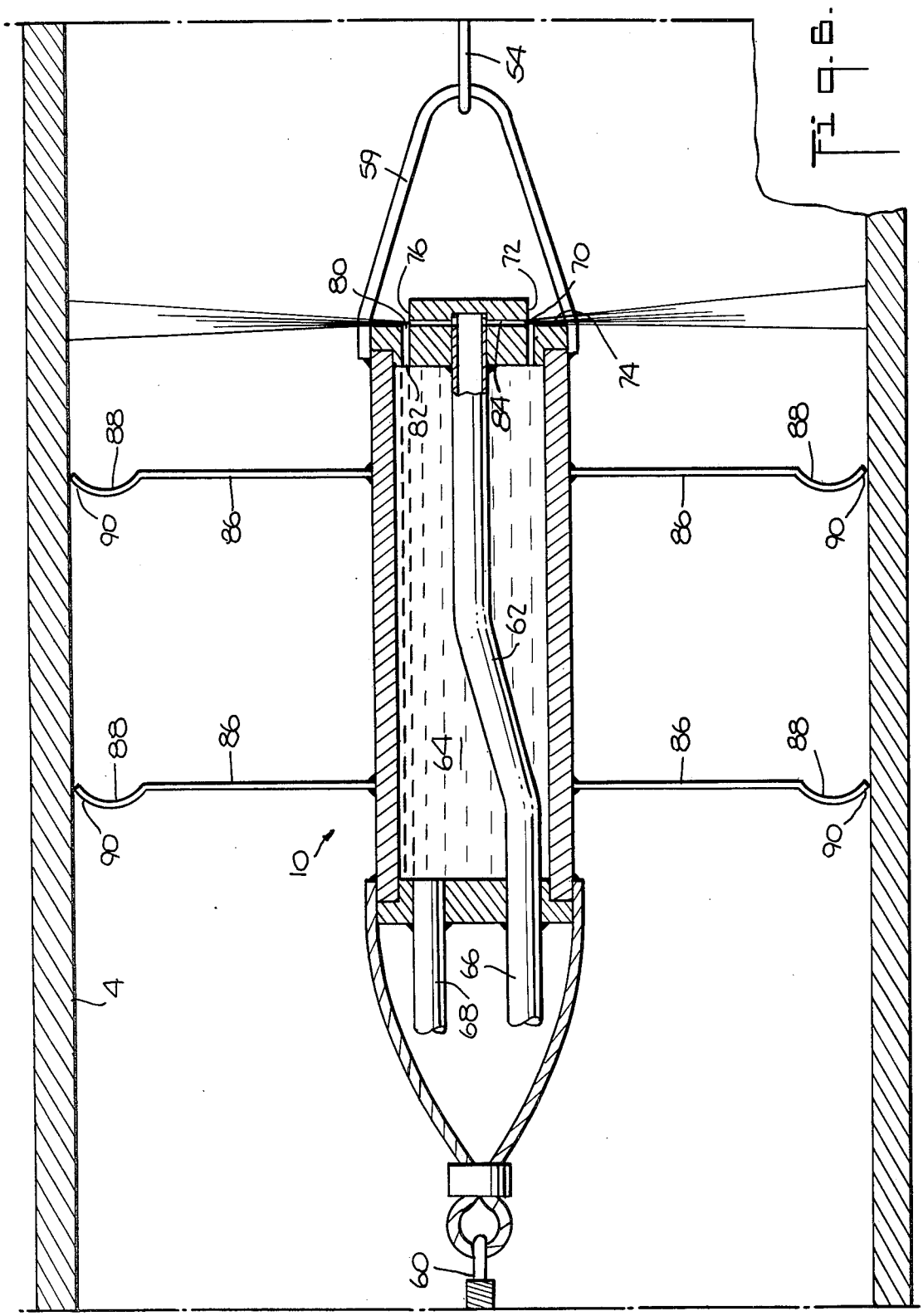

APPARATUS FOR LUBRICATING ELECTRICAL CABLE

This is a division of application Ser. No. 39,484, filed May 15, 1979, now U.S. Pat. No. 4,296,837.

FIELD OF THE INVENTION

This invention relates generally to lubricating materials which are to be drawn through relatively long confined openings. More particularly, the invention relates to an apparatus and a process for lubricating electrical cable or cable bundles which must be drawn long distances through electrical conduit pipes.

BACKGROUND OF THE INVENTION

It is customary to lay cable and cable bundles which extend long distances in conduit pipe. Conduit pipe is essentially a pipe provided to serve as a channel or container in which the electrical cable is permanently housed. Typically, the conduit pipe is embedded in the ground and the cable or cable bundle is pulled through the conduit by a mechanical means such as a winch. In general, the conduit pipe is provided with a diameter considerably larger than the diameter of the individual cable or cable bundle being housed by the conduit. However, large friction forces develop between the cable and the interior conduit walls which make it difficult to pull the cable through the conduit. It is customary to lubricate the cable at the entry end of the conduit to minimize the friction between the cable and the conduit walls. The cable lubricating procedure is typically accomplished manually. A man with a container of lubricant positions himself at the entry end of the conduit and continuously applies the lubricant from the container directly to the cable or cable bundle as the cable is pulled through the conduit. In practice, it has been found that the lubricant will be scraped from the cable soon after the particular section of cable has been drawn about twenty-five to thirty feet into the conduit.

It has become necessary and customary to use a winch to pull the cable or cable bundle through the conduit. However, with present state of the art techniques there is a limit to the length through which cable can be drawn. If an effort is made to draw the cable too far something will be damaged. Either the cable will break as a result of the friction forces generated between the conduit wall and the cable, the winch will reach a level whereby power is not available to overcome the friction force imposed on the cable or damage to the cable insulation or the interior walls of the conduit will occur. Regardless of which failure occurs, the failure is almost always attributable to the friction forces imposed on the cable by the conduit wall.

Therefore, it has become customary to limit the length that the cable bundle is drawn. The length limitation necessitates laying the cable in sections. At the end of each section the cable must be spliced to a subsequent cable section and the cable drawing process repeated. When the conduit pipe is underground, which is usually the case, manholes or hand holes must be dug and located at the exit end of each conduit section to facilitate splicing and drawing of cable through the next conduit section. Typically, the distances between the manholes or hand holes will vary from 300 feet to 500 feet and, in embodiments wherein tight bends occur, the distances must be much shorter.

SUMMARY OF THE INVENTION

It is thus an object of the present invention to provide a process and apparatus for lubricating cable to be drawn through conduit pipe which will minimize the number of cable splices required in an operation, minimize the number of manholes required in the overall operation and accordingly enable increase of the distance between manholes.

It is a further object of the present invention to provide an apparatus and process for lubricating cable which minimizes the friction between the conduit wall and the cable.

It is another object of the present invention to provide an apparatus and assembly for lubricating cable which facilitates uniform lubrication and continuous metered lubrication of cable at the entry end of the conduit.

It is still another object of the invention to provide an apparatus and a process for lubricating cable being drawn through conduit pipe which insures continuous uniform lubrication of the conduit walls adjacent the leading edge of the cable bundle as the cable bundle travels through the conduit.

The apparatus of the present invention is comprised of a nozzle assembly adapted to be releasibly mounted at the entry end of a conduit, which nozzle assembly uniformly distributes the lubricant to the cable bundle. The apparatus also consists of a nozzle device which is mounted at the leading end of the cable bundle and which travels with the leading end of the cable bundle through the conduit pipe.

DESCRIPTION OF THE DRAWINGS

The invention set forth will be better understood when considered with the following drawings wherein:

FIG. 1 is an isometric partial elevation view of the apparatus of the present invention;

FIG. 2 is a front elevational view of the apparatus of the invention attached to the entry end of a conduit;

FIG. 3 is a sectional elevational view through line 3—3 of FIG. 1;

FIG. 4 is a sectional elevational view through line 4—4 of FIG. 1;

FIG. 5 is an exploded view of the entry end conduit lubricating assembly; and

FIG. 6 is a sectional elevational view through line 6—6 of FIG. 1.

DESCRIPTION OF THE PREFERRED EMBODIMENT

The process and apparatus of the present invention is directed to lubricating cable or cable bundles which are drawn through conduit pipes. As best seen in FIG. 1, a cable bundle 2 is shown within a conduit 4 with the apparatus of the present invention.

An entry end lubricating assembly 6 is releasibly attached to the entry end 8 of the conduit 4. A lubricating assembly 10 adapted to travel slightly in advance of the leading end 12 of the cable bundle 2 is shown located within the conduit 4.

The entry end lubricating assembly 6 as seen in FIGS. 1, 2 and 5 is comprised essentially of a split ring 14 having half sections 16 and 18 which are attached by a hinge 20, four nozzle members 22A, 22B, 22C, and 22D arranged in the ring 14, and a split adjustable sleeve 24, provided to releasibly attach the entry end lubricating assembly 6 to the entry end 8 of the conduit 4. Appropriate plumbing such as hoses 26 for the delivery of lubricant to the nozzles 22A-22D and hoses 28 for the delivery of air to the nozzles 22A-22D are also included. In addition, a means for locking the split ring assembly 14 to the attachment sleeve 24 is provided in the form of an internal recess 31 and a pivotally mounted bolt 23 and mating lug means 21. The bolt 23 is pivotally attached to the split ring member 16 and the mating lug means 21 is formed on the split ring member 18. A wing nut 29 is threaded on the bolt 23 and bears against the lug 21 to retain the ring 14 in the closed position.

In addition, as can be best seen in FIGS. 1 and 5, the entry end lubricating assembly 6 is formed with a smooth flared surface 30 which extends outwardly from the inner end of the opening 32 in the entry end lubricating assembly 6 to the exterior. The smooth flared surface 30 facilitates passage of the cable bundle 2 through the entry end lubricating assembly 6.

As seen in FIG. 1, each nozzle assembly 22A-22D is comprised of a block having internal chambers 38 and 40 terminating in openings 42 and 44 respectively, and a notched nozzle opening 46 which consists of surfaces 48 and 50 that form a 90° angle. Air is directed through the nozzle opening 42 and lubricant is directed at essentially a 90° angle to the passage of air at the other surface 50 through the opening 44. The air directs the lubricant against the nozzle surface 50 and inwardly into the conduit directly at the cable bundle 2.

As best seen in FIGS. 3 and 5, the adjustable sleeve 24 used to secure the entry end lubricating assembly 6 to the conduit 4 is formed with a flange 25 at one end and is split into two half sections 33 and 35. Section 33 of the adjustment sleeve 24 carries a nut 34 welded along one of the split edges and section 35 carries a mating nut and bolt member 36 which cooperate with the nut 34 to expand and contract the sleeve 24 to thereby provide the necessary expansion force on the inner wall of the conduit 4 to secure the adjustable sleeve 24. The flange 25 is provided to fit within the recess 31 in the ring 14; thus, the outside diameter of the flange 31 is slightly less than the diameter of the recess 31.

The internal lubricating assembly 10 best seen in FIG. 1, is attached between the line 52 extending from the winch (not shown) and the Kellems grip 54 which is conventionally used to connect a cable to the winch line 52. The internal lubricating assembly 10 is comprised of a centrally disposed cylinder 56 which carries an annular array of nozzles 58A, 58B, 58C and 58D in proximity to the leading end 12 of the cable bundle 2.

The cylindrical member 56 is provided with a front hook 59 and a rear hook 60 and has an internal passage 62 and a chamber 64 respectively formed thereon for air and lubricant. Lines 66 and 68 extend from the exterior of the downstream section of the conduit 4 and supply air under pressure and lubricant respectively to the cylinder 56. The nozzles 58A-58D are located in an annular recess 70 on the end facing the leading end 12 of the cable bundle 2.

The recess 70 effectively forms two surfaces 72 and 74 which meet at a right angle. The surfaces are oriented such that the surface 72 is virtually parallel to the inner wall of the conduit 4. The nozzles 58A-58D are comprised of openings 76 in surface 72 and companion openings 80 in surface 74. The openings 80 communicate with the lubricant chamber 64 by passages 82. Lubricant is delivered to the openings 80 through passages 82 and air is delivered to openings 76 through passages 84. In operation, air is supplied at a rate to deliver the lubricant through the nozzles 58A-D at from one quart to two quarts per minute. On the preferred embodiment, the air directs the lubricant over surface 74 toward the interior walls of the conduit 4.

The cylinder 56 also has a plurality of spokes 86 extending radially therefrom as seen in FIGS. 4 and 6. The spokes 86 are formed of leaf spring material each of which has essentially the dimension to reach the cylinder 56 to the inside wall of the conduit 4. Each end 88 of the spokes 86 is contoured to provide a rounded edge 90 that bears against the inner wall of the conduit 4 and functions to locate the lubricating cylinder 56 centrally within the conduit 4. The contoured edge 90 avoids damage to the conduit 4 during passage through the conduit.

The process of the present invention consists of mounting the entry end lubricating member 6 on a conduit 4 by the split attachment sleeve 24. The split attachment sleeve 24 is first placed within the entry end 8 of the conduit 4 and the bolt 36 is screwed into the nut 34 to expand the respective surfaces 30 and 32 and thereby impose a compressive force on the walls of the conduit 4. With the attachment sleeve 24 secured to the conduit, the split ring lubricating assembly 6 is opened about the hinge 20 and mounted within the recess 31 on the flange 25 of the attachment sleeve 24.

The lubricating member 10 is secured in advance of the leading end of the cable bundle 2 by attaching the Kellems grip 54 to the front hook 59 and the winch line 52 to the rear hook 60.

The lubricant can be delivered to the cable bundle 2 at any time. However, in practice it has been found that some lurbricant should be spread on the cable 2 by the entry end lubricating assembly 6 before the winch is engaged to pull the cable bundle 2. After the winch begins pulling the cable bundle 2, the entry end lubricating assembly 6 is operated typically at a rate of one to two quarts per minute and the leading end lubricating assembly 10 is also operated at one to two quarts per minute.

Among the suitable lubricants for operating with both the entry end lubricating assembly 6 and the leading end lubricating assembly 10 are YELLOW-77 manufactured by Ideal Ind., Inc., SLIP-X100 (American Colloid Co.) and BISHOP No. 45 (Sola-Basic Inc.). The lubricant openings 44 in the nozzles 22A-22D are preferably 1/32 inch diameter and the air openings 42 in the nozzles 22A-22D are 1/16 inch diameter. The lubricant openings 80 are 1/32 inch diameter and the air openings 78 are 1/16 inch diameter.

The present invention contemplates using the entry end lubricating assembly 6 with the leading end lubricating assembly 10, however, either can be used independently of the other.

It should be noted that means other than air under pressure can be used to deliver or pump lubricant through the nozzles of lubricating assemblies 6 and 10.

I claim:

1. An apparatus for uniformly distributing lubricant over a cable being pulled through a conduit at the entry end of the conduit continuously as the cable moves through the conduit comprised of:
    an adjustable flanged sleeve;
    means for releasibly securing the adjustable flanged sleeve to the entry end of the conduit with the flange projecting from the conduit;
    a ring adapted to be mounted on the flange; and a plurality of nozzles located equidistantly around the ring facing the cable.

2. An apparatus as in claim 1 further comprising a recess in the interior of the ring in which the flange of the adjustable sleeve fits.

3. An apparatus as in claim 1 further comprising:
a first and second nozzle surface for each nozzle which surfaces are arranged at an angle of 90° to each other with the first surface oriented at an angle to the cable directed toward the interior of the conduit;
a passage for lubricant terminating in an opening in the first nozzle surface;
a passage for air terminating in the second surface;
means for directing lubricant through the lubricant passage; and
means for directing air through the air passage to deliver lubricant over the first nozzle surface at an angle to the cable toward the interior of the conduit.

4. An apparatus as in claim 1 wherein the ring is a split ring of two sections hingedly attached on one side and provided with means for releasibly attaching the opposite side to provide a continuous ring.

5. An apparatus as in claim 4 wherein the means for releasibly attaching the split ring is a pivotably mounted bolt attached to one section of the two half sections and a lug attached to the other half section which lug mates with the bolt; and a wing nut threaded to the bolt.

* * * * *